United States Patent [19]

Miller, Jr.

[11] 3,955,950
[45] May 11, 1976

[54] CYCLONE VESSEL HANGER SYSTEM

[75] Inventor: James Frank Miller, Jr., Lebanon, Pa.

[73] Assignee: Envirotech Corporation, Menlo Park, Calif.

[22] Filed: May 19, 1975

[21] Appl. No.: 578,953

[52] U.S. Cl. ............................ 55/459 R; 23/288 S; 248/317
[51] Int. Cl.² ......................................... B01D 45/12
[58] Field of Search ..................... 55/459, 345, 349; 248/317, 324, 54 CS, DIG. 1; 23/288 S

[56] References Cited
UNITED STATES PATENTS

| | | | |
|---|---|---|---|
| 2,985,516 | 5/1961 | Traup et al. | 55/343 |
| 3,333,402 | 8/1967 | Kalen | 55/459 |
| 3,460,785 | 8/1969 | Abidi | 23/288 S |

*Primary Examiner*—Bernard Nozick
*Attorney, Agent, or Firm*—Robert E. Krebs; Thomas S. MacDonald

[57] ABSTRACT

A hanger system particularly for cyclone collectors in a fluidized particle process vessel, such as a fluid catalytic cracker regenerator vessel, wherein a vertical supporting member is pinned at one end to a cyclone wall lug and at the other through a slot in a vessel depending lug so that thermal and mechanical stresses within the overall assembly are compensated for by sliding movement of the pin in the slot, which movement is controlled by a stabilizing linkage member attached to the pin at one end and pivotably attached at the other end to the vessel.

6 Claims, 10 Drawing Figures

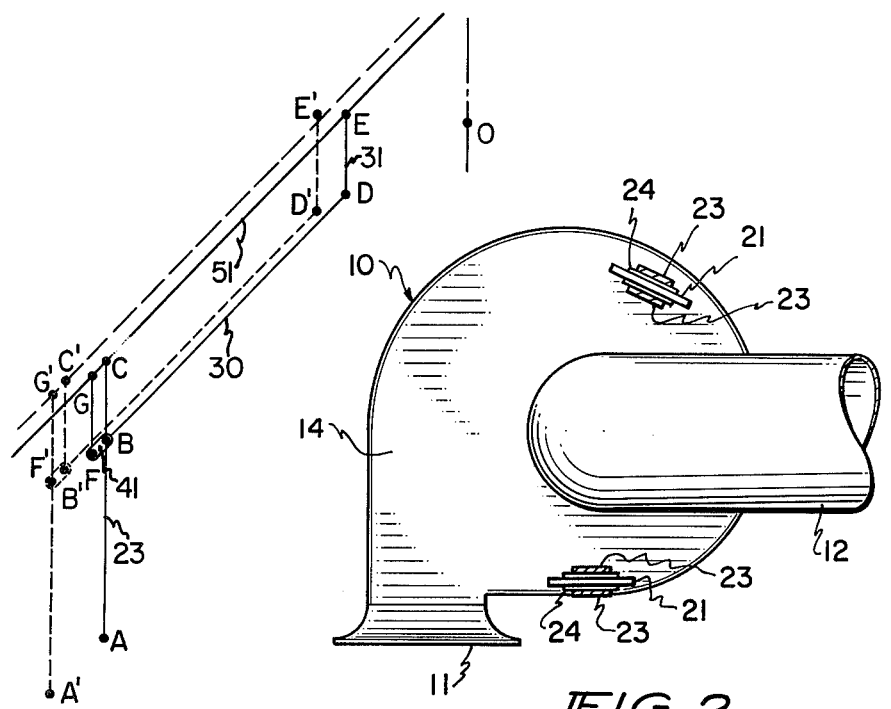
FIG. 10
FIG. 2
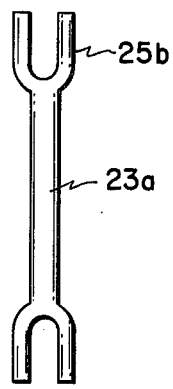
FIG. 9
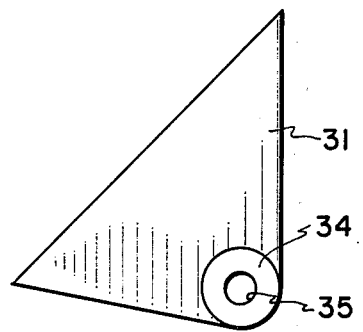
FIG. 6
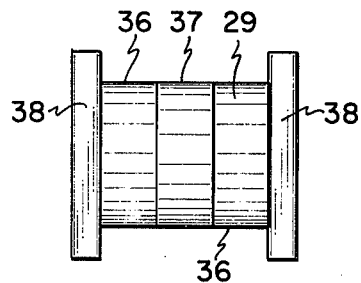
FIG. 7
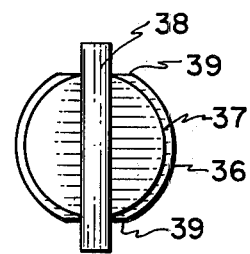
FIG. 8

CYCLONE VESSEL HANGER SYSTEM

FIELD OF THE INVENTION

This invention relates to a system for vertically supporting vessels such as cyclone-type mechanical dust or particle collectors used principally in the recovery of catalyst particles or other solids in other vessels such as fluid catalytic cracker regenerators employed in the oil refinery industry and fluid bed reactors employed in the petrochemical industry.

STATE OF THE ART

In a cyclone collector, a gaseous fluid with entrained solids or liquids is introduced into a main cylindrical chamber tangentially so as to cause the fluid to spin in a downward spiral. Reference is made to Gallaer U.S. Pat. No. 3,745,752 for a full description of a modern cyclone collector and to the Industrial Pollution Control Handbook, H.F. Lund, Editor, McGraw-Hill 1971, pages 23–16 to 23–20 for a general description of cyclone operation.

When one or more cyclone collectors operate in a vessel such as a fluid catalytic cracker regenerator vessel a differential temperature in the order of 900°F (480°C) exists between the collectors themselves and the vessel in which they are typically installed. As a regenerator vessel is heated from ambient temperature to operating temperature, the greater thermal expansion of the cyclones relative to the thermal expansion of the vessel results in considerable movement of the cyclones relative to the vessel nozzle which discharges the gaseous fluid from the vessel after it has passed through the cyclones.

Use of different materials of construction for the cyclones having higher co-efficients of expansion than the materials of construction for the vessel further contributes to the movement of the cyclones relative to the vessel dischage nozzle. As shown in U.S. Pat. No. 3,333,402 (FIG. 2), many individual cyclones 30 may be mounted within a vessel 12 and each supported by a hanger device 66 (FIG. 3). The hanger device of U.S. Pat. No. 3,333,402 includes two inclined links which continually transmit horizontal components of force to the vessel wall when the system is at operating temperature.

Other support means for cyclones are seen in U.S. Pat. Nos. 2,370,444; 3,254,476 and 2,985,516; however, none of these supports allow for complete vertical support of the cyclone while still allowing for proper load carrying and expansion of the hanger elements and the structures to which they are attached to accommodate thermal and mechanical stresses. Nonvertical cyclone supports induce horizontal components of force between the cyclone gas outlet duct and the vessel nozzle or plenum to which the gas outlet duct is connected. This frequently causes the cyclone outlet duct to tear away from the nozzle or plenum.

OBJECTS OF THE INVENTION

A primary object of the present invention is to provide a hanger system for a vessel such as a cyclone collector, particularly in high temperature environments, in which the members supporting the vessel are vertical at all times thus minimizing horizontal forces causing ductwork failures and further to minimize horizontal forces in the hanger system and horizontal forces transmitted to the vessel by the hanger system at the operating temperature. A more specific object of the invention is to provide a hanger system for refinery catalyst recovery cyclone collectors which can operate at high temperature differentials and minimize failure-causing horizontal stresses.

BRIEF DESCRIPTION OF THE DRAWINGS

Further objects and advantages of the present invention may be readily ascertained from the following description and appended illustrations which are offered by way of illustration only and not in limitation of the invention, the scope of which is defined by the appended claims and equivalents to the structure, material and steps recited therein. In the drawings:

FIG. 2 is a top view of the cyclone collector taken on the line 2—2 of FIG. 1.

FIG. 6 is a plan view of a third lug member for attaching the linkage member.

FIG. 7 is a plan view of a typical pin means.

FIG. 8 is an end view of the pin means of FIG. 7.

FIG. 9 is a plan view of a second modification of the support or linkage members.

FIG. 10 is a diagrammatic illustration of the cold and hot positions of the hanger system, with the cold position shown in full line and the hot position in phantom line.

DETAILED DESCRIPTION OF THE PREFERRED EMBODIMENT

Figures 1, 3, 4, 5:
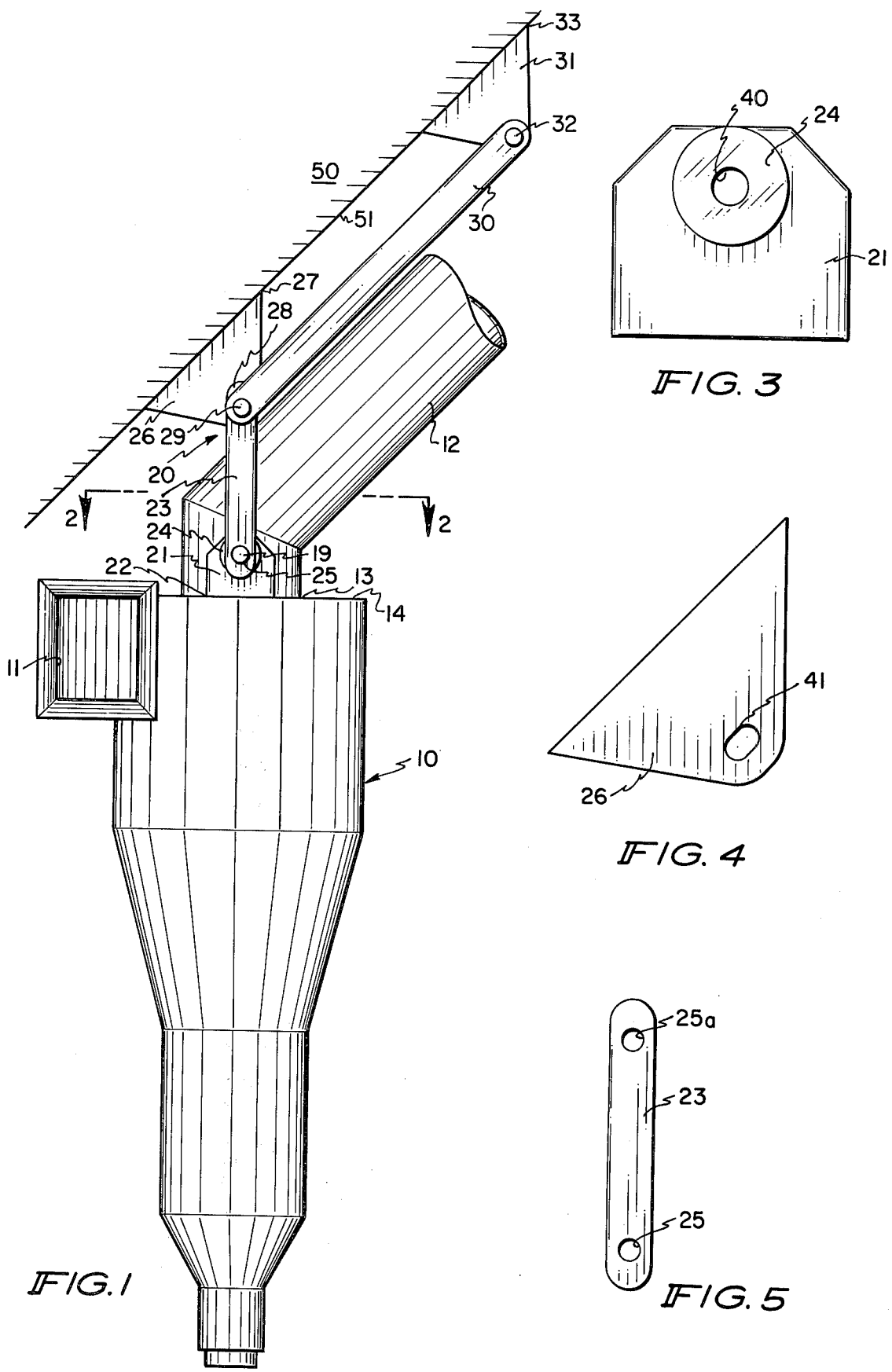
FIG. 1 is a partial front view of the hanger system supporting a cyclone collector within a vessel.
FIG. 3 is a plan view of the cyclone hanger lug.
FIG. 4 is a plan view of a reactor vessel hanger lug.
FIG. 5 is a plan view of one modification of a hanger support or linkage member.

FIG. 1 shows the top portion of a cyclone collector 10 which on its exterior shows an inlet duct 11 into which gases, containing solid particulates are conducted and an outlet pipe 12 through which the gases having solid particulates removed therefrom pass. Arrows 9 indicate the transport of the solid particulates to an exit port at the bottom of the cyclone. While only one cyclone collector is shown in FIG. 1, it is to be understood that there may be two or more cyclones connected in series to give staged treatment of the particulate containing gases and that multiple cyclone collectors would normally be situated in an external vessel in which the cyclone collectors are mounted, much in the manner shown in FIG. 2 of the aforementioned U.S. Pat. No. 3,333,402. Exit conduit 12 is welded or otherwise affixed at 13 to the top surface 14 of collector 10. Upstanding from the top surface 14 is a first lug 21 fixedly connected as by welding at 22 to the top surface 14. A circular aperture 40, more clearly shown in FIG. 3, is located in the outboard portion of lug 21.

The overall hanger system includes the above described lug 21, a second lug 26 fixedly connected as by weld 27 to a wall 51 of an exterior vessel 50, such as a reactor vessel or regenerator vessel. A slot 41, shown more clearly in FIG. 4, is longitudinally disposed in an outboard portion of lug 26. A supporting member 23 with circular apertures at each extends generally vertically between lug 21 and lug 26.

As shown in FIG. 2, strap members 23 normally are mounted as a pair on either side of the respective lugs 21 and 26. The straps are journaled by pins 19 and 29 within the aperture 25 and a slot 41, respectively, in lugs 21 and 26. Pin means 29 extends through the slot 41 and is capable of providing for sliding movement within that slot. Slot 41 is at an angle with respect to the vertical supporting member 23 and, thus, has both horizontal and vertical components of direction. Also journaled with pin means 29 is an elongated stabilizing linkage member 30 which extends generally parallel to wall 51. This member likewise is apertured at each end thereof with the pin means 29 passing through the aperture at the end situate at lug 26. Thus, stabilizing linkage member 30 is also capable of movement with respect to lug 26. The opposite end of linkage member 30 is pin connected to a third lug 31 by a third pin means 32. Lug 31 is connected to a portion of the external vessel wall 51 as by welding at 33 in a position spaced from the location of the second lug. As with supporting member 23 stabilizing linkage member 30 in the preferred embodiment comprises two straps overlying the exterior of straps 23 and lug 31.

The hanger system is adaptable to compensate for expansion regardless of whether the cyclone collector, the external vessel and the components of the support system are of the same material or different materials. Linkage member 30 only supplies a force during the time when the temperature inside the external vessel 50 is less than the operating temperature. When the operating temperature is reached pin 29 has moved to the lowest point in slot 41, lug 26 carries the entire cyclone load and the force applied by member 30 is zero. The support member 23 is in a vertical position. In the hanger system of this invention, additional horizontal forces are only supplied to the vessel lugs 26 and 31 while the system is cool and during the period that the system is heating up to operating temperatures. During these cool and heating up periods, the vessel shell 51 and the components making up the hanger system 20 have their greatest strength. Thus, the present system provides for having the least stress applied to the system at the time the system itself has the least strength, i.e., at its high temperature operating conditions. It is to be understood that lug 31 may be attached to a plenum chamber or other structure within the exterior vessel 50 rather than to the particular vessel roof wall 51 as shown.

FIG. 2 shows a top view of a cyclone collector 10 and the disposition of a pair of lugs 21 on opposite sides thereof for supporting the collector. Shown in cutaway cross section are the pairs of straps 23 which are pinned on either sides of lugs 21. The tangential feed through inlet 11 and the central exhaust 12 are clearly seen in FIG. 2.

FIG. 3 is a detailed plan view of lug 21 showing clearly the aperture 40 surrounded by a boss 24.

FIG. 4 shows in detail lug 26, more particularly the longitudinally extending slot 41 situate at an outboard extremity of the lug. The length and slope of this slot is determined by the movement of cyclone 10 relative to vessel wall 51. While the sides of the slot are shown to be flat, in some applications the position of cyclone 10 and the expansion of straps 23 with respect to wall 51 at temperatures between the cold and hot temperature may dictate that the sides of slot 41 should have some curvature.

FIG. 5 shows support member 23 with apertures 25 and 25a at either end thereof. Aperature 25 is situated adjacent to aperture 40 of lug 21 while aperture 25a is aligned with slot 41 in lug 26. Stabilizing linkage memeber 30 is a similar construction to member 23 but normally will have a length greater than the length of member 23.

FIG. 6 shows the third lug 31 which comprises an outboard aperture 35. The end of stabilizing linkage member 30 is journaled by pin 32 in aperture 35. While lug 31 as well as lugs 21 and 26 are shown to have one thickness throughout the lug these lugs could have a lesser thickness where they attach to the vessel wall or cyclone. The additional thickness required at the apertures may be achieved by machining or welding bosses 34 around the apertures or by other means.

FIG. 7 shows a typical pin member 29 which is employed as a pin means situate in and through slot 41. Pin means 29 comprises a shank portion 37 which is within the slot 41 and end portions 36 which are journaled within the apertures contained in members 23 and 30. Locking bars 38 are provided on each end of the pin means. These locking bars 38 are welded to both ends of pin and lock the pin means into the slot and straps 23 and 30. While the ends of pin member 29 are shown with locking bars these ends could be extended and threaded to receive nuts.

As shown in FIG. 8, the surface 37 has flattened portions 39 on either side thereof corresponding to those surfaces on the edge of the slot 41. This flat surface functions so as to spread out the stress and prevent a concentrated load possibly causing indentations on the edge surface of the slot 41 due to high stress concentration. If the sides of slot 41 have some curvature then flattened portions 39 should have a matching curvature. Likewise, the sliding pin may itself be rectangular in cross section or other geometric shape.

FIG. 9 is a modification of the connecting member 23. It shows a rod 23a which extends between lugs 21 and 26, such rod having clevises 25b formed at each end thereof which are pinned to lug 21 and lug 26. The lower extremity of rod 23a or straps 23 and the outboard extremity of support member 30 may be pinned with conventional pinning means of the type generally shown in FIG. 7 without the flattened portions 39.

FIG. 10 shows the position of the different components of the system at the cold and hot temperatures. All movement or expansion is calculated from a Point O which is located on the vertical centerline of the external vessel at the same elevation as Point P, the weldment of the discharge plenum or nozzle to said external vessel 50. With Point O so located, all movement of said cyclone 10 and all members of said support system relative to the external vessel 50 effected by thermal expansion will be horizontally outward and vertically downward from Point O. In the employment of the invention the vertical and horizontal movement of all points away from Point O is first calculated using the generally recognized formula:

$$\Delta L = C_e \times L \times \Delta T$$

Where:
 $\Delta L$ = Linear expansion in linear units,
 $C_e$ = Average coefficient of expansion for material between cold and hot conditions in linear units per linear unit per thermal unit,
 $L$ = Length of material at cold temperature in linear units, and
 $\Delta T$ = Difference in temperature between cold and hot conditions in thermal units.

In FIG. 10 Point A will be Point A' at the hot condition. Point C is located on external vessel wall 51 vertically above Point A. Point B is the higher end of slot 41 and is located on the vertical line between Point A and Point C. Points A and B correspond to the apertures in support member 23. At hot condition Points B and C will be located at Points B' and C' respectively. Because the temperature rise of the external vessel is generally much less than the temperature rise of components within the external vessel, movement of Point C is considerably less than the movement of Point A. Therefore, at the hot condition a vertical line from Point A' will intersect the vessel wall 51 at Point G' and the upper aperture 25a in the vertical support member 23 will be at Point F' the lower end of slot 41 at the hot condition. At the cold condition Points F' and G' are located at Points F and G respectively.

Point D is the aperture in said lug 31 through which pin 32 is inserted. Point E is located on external vessel wall 51 vertically above Point D. At the hot condition Point E moves to Point E' and Point D', the location of Point D at the hot condition, will be vertically below Point E'. The distance between Points D' and E' will be greater than the distance between Points D and E because of thermal expansion. Point E must be so located that the distance between Points B and D correspond to the distance between the two apertures in stabilizing linkage 30 at the cold condition and that the distance between Points D' and F' corresponds to the distance between the two apertures in linkage 30 at the hot condition.

Typically the hanger system and cyclone will be made of an alloy steel such as Type 304SS while the regenerator vessel or the like in which it is located and is attached is of plain carbon steel.

I claim:

1. A hanger system for mounting an internal vessel in a depending position to a bulkhead wall of an external vessel comprising:
  a. a first lug fixedly connected to a wall of the internal vessel, means forming an aperture in said first lug;
  b. a second lug fixedly connected to and depending from a wall of the external vessel, means forming a longitudinal extending slot in said second lug;
  c. a support member pinned through the aperture in said first lug and vertically extending to said second lug to support said internal vessel;
  d. pin means within said slot connecting said support member to said second lug, said slot having horizontal and vertical components of direction permitting sliding movement of said support member with respect to the second lug;
  e. an elongated stabilizing linkage member extending generally parallel to the direction of said slot, said linkage member having means forming an aperture adjacent each end thereof, said pin means extending through the aperture at one end of said linkage member permitting movement of said pin means within the slot; and
  f. means including a second pin means for pinnedly connecting the end of said linkage member opposite the slot to a portion of said external vessel wall spaced from said second lug location.

2. The invention set forth in claim 1 in which said pin means includes opposed flatten portions in sliding engagement with longitudinal edge portions of said slot.

3. The invention set forth in claim 1 in which said support member and said linkage member each comprise a pair of metal straps, each strap of a pair being parallel to the other of that pair and situate on opposite sides of said first and second lugs.

4. The invention as set forth in claim 1 in which said support member and said linkage member each comprise rod elements having clevises at each end for attachment to said first and second lugs and said external vessel.

5. The invention as set forth in claim 1 in which said internal vessel is a cyclone collector and said first lug upstands from a top substantially horizontal surface of said cyclone collector.

6. The invention as set forth in claim 1 further including a third lug member depending from said external vessel wall to which the linkage member is connected at its end opposite the slot in said second lug.

* * * * *